Jan. 24, 1961     E. H. BILLET ET AL     2,969,235
AUTOMATIC CAMERA APPARATUS FOR MAKING UP PRINTED COPY
Original Filed Dec. 12, 1955     6 Sheets-Sheet 1
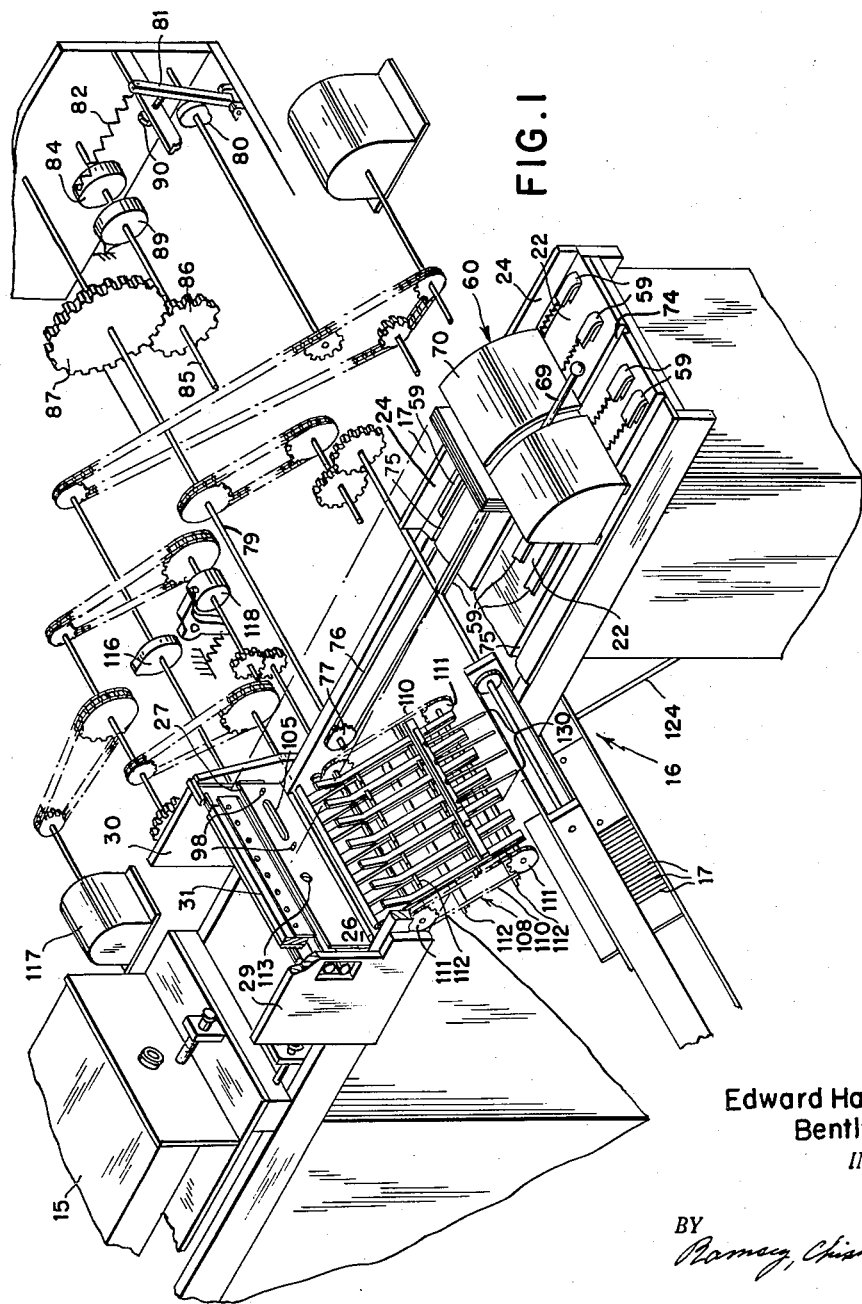
Edward Harris Billet
Bently Raak
*INVENTORS*
BY
ATTORNEYS

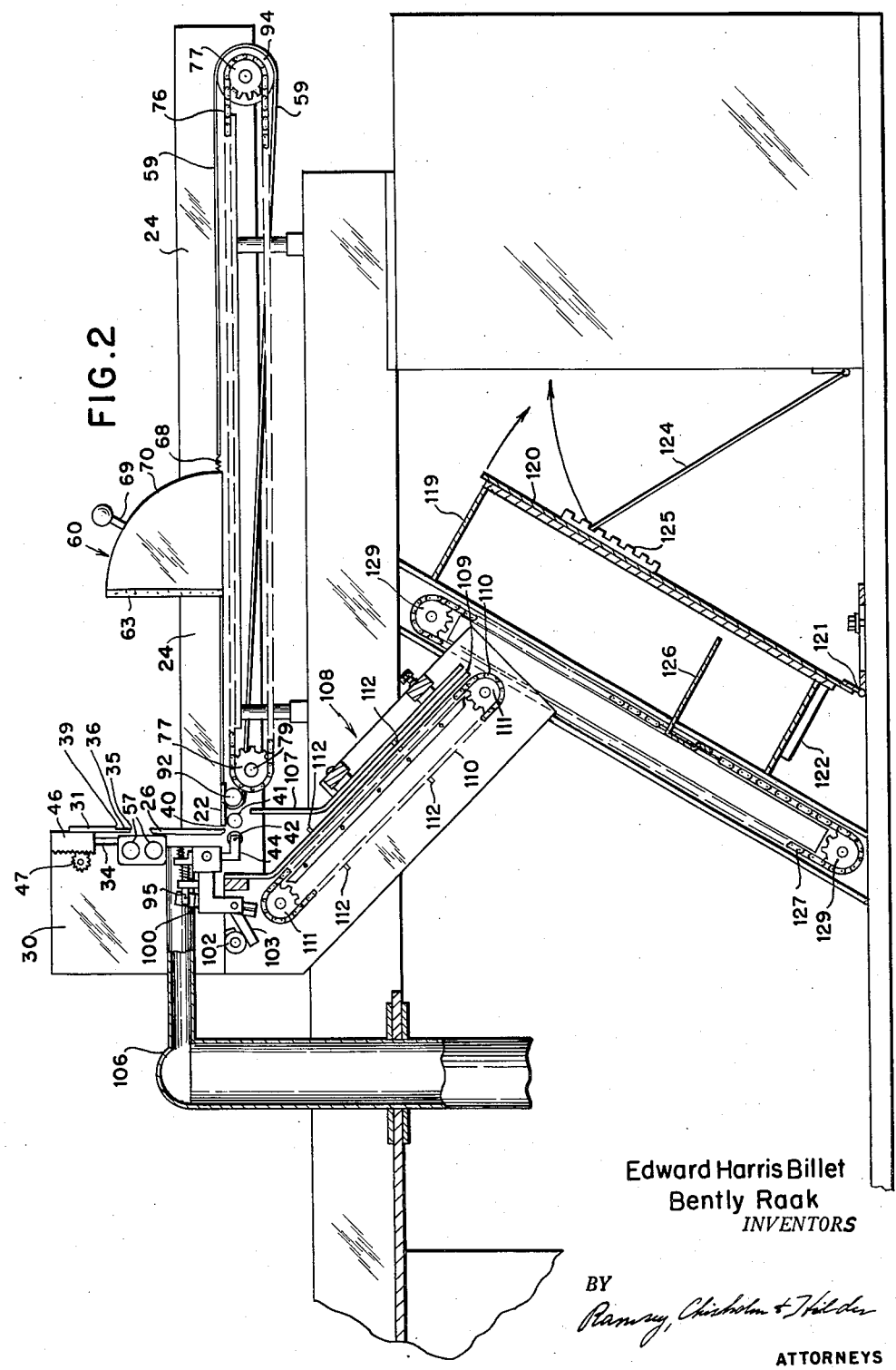

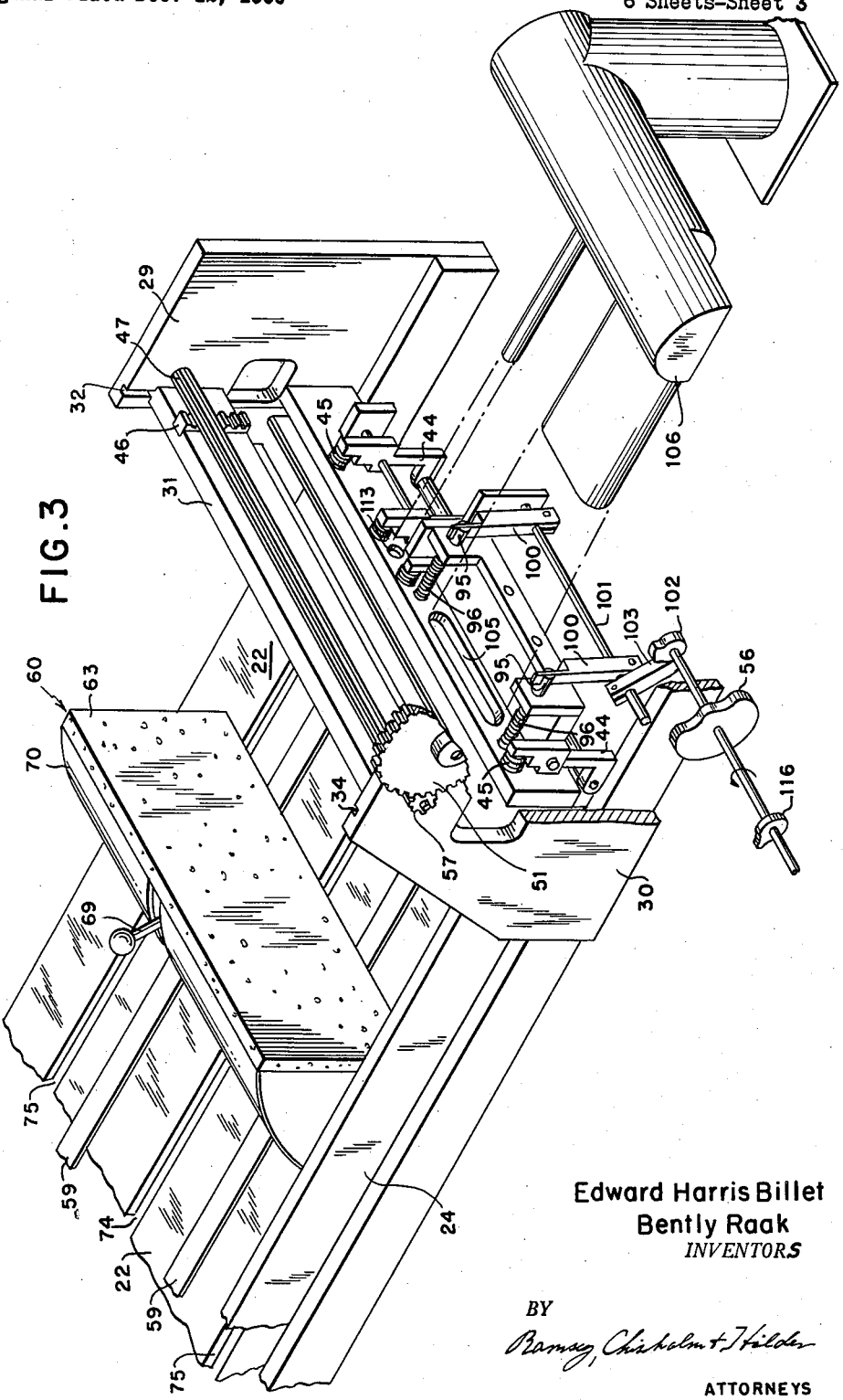

Jan. 24, 1961  E. H. BILLET ET AL  2,969,235
AUTOMATIC CAMERA APPARATUS FOR MAKING UP PRINTED COPY
Original Filed Dec. 12, 1955  6 Sheets-Sheet 4
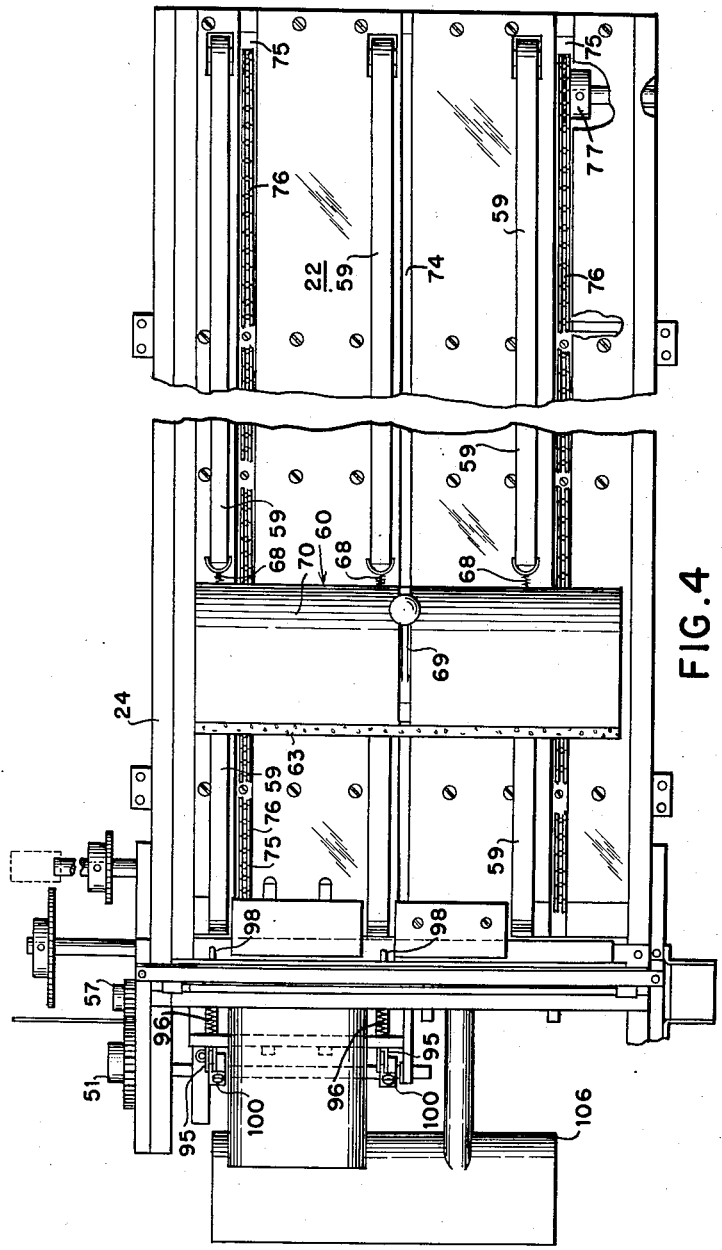
Edward Harris Billet
Bently Raak
INVENTORS
BY
ATTORNEYS Jan. 24, 1961 E. H. BILLET ET AL 2,969,235
AUTOMATIC CAMERA APPARATUS FOR MAKING UP PRINTED COPY
Original Filed Dec. 12, 1955 6 Sheets-Sheet 5

Edward Harris Billet
Bently Raak
INVENTORS

BY
Ramsey, Chisholm + Hilder
ATTORNEYS

Edward Harris Billet
Bently Raak
*INVENTORS*

United States Patent Office 2,969,235
Patented Jan. 24, 1961

2,969,235

AUTOMATIC CAMERA APPARATUS FOR MAKING UP PRINTED COPY

Edward Harris Billet, Union, and Bently Raak, Roselle, N.J., assignors to Vari-Typer Corporation, Newark, N.J., a corporation of Delaware Continuation of application Ser. No. 552,472, Dec. 12, 1955. This application Nov. 21, 1958, Ser. No. 776,663

12 Claims. (Cl. 271—43)

This invention relates to a method and apparatus useful in the making up of printed matter. The present application is a continuation of my application Serial No. 552,472, filed December 12, 1955.

In photolithography, a negative of one or more columns of typed or otherwise written material is employed for the photoetching of a printing plate. The present invention is directed to an improved method and apparatus useful in the production of such negatives.

According to the present invention, which is particularly advantageous for production of directories and other listings, the material to be made up is typed or otherwise composed on cards, preferably using a machine such as the "Vari-Typer" typewriter, one line being written on each card. The line of writing is in the same relative position on each card and is very precisely located with respect to a physical feature of the card, e.g., a hole formed in the card when the line is written thereon. The cards, in regular order, are then photographed by an automatic camera in which a film is progressed past an aperture, successive zones of the film being exposed in photographing the typed line on successive cards so as to provide a columnar makeup of the lines appearing on the cards. The apparatus herein to be described is in some respects an improvement over that shown in the copending application of Edward Harris Billet, Serial No. 428,672.

According to the present invention, a stack of cards to be photographed is moved against a face plate and the foremost card of the stack photographed, that card then being fed downwardly so as to permit the next succeeding card of the stack to be subsequently photographed. The cards are provided with holes for accurately positioning the cards during photographing.

To facilitate the loading of cards to be photographed into the machine, short retractable pins are used to position only the first few cards of the stack, the pins being retracted during the card-feeding portion of the operating cycle of the machine. In order to reduce or eliminate pressure, and, therefore, the amount of friction, between the cards so as to facilitate feeding the foremost card from the stack, a slight vacuum or reduced air pressure is applied to the forward face of the foremost card to hold it flat against the face plate during photographing and feeding downwardly without the necessity of pressing the entire stack against the face plate.

In the machine of the present invention, the photographed card is slid downwardly from the stack and deposited in a card conveyor, each card being conveyed in sequence and deposited in a file drawer without disturbing the orientation of the card.

Among the objects of the present invention are to provide a machine having an improved card feed in which the feed is uniform and dependable so that after each exposure of the film, one and only one card will be removed from the stack of cards; to provide such a machine in which the cards being removed from the stack are completely under the control of the machine and are stacked in order and without reversal in a file drawer or other receptacle; to provide a machine in which feeding pressure on the stack of cards is reduced or entirely eliminated, and to generally improve machines of the type described.

My invention is clearly defined in the appended claims. In the claims, as well as in the description, parts may at times be identified by specific names for clarity and convenience, but such nomenclature is to be understood as having the broadest meaning consistent with the context and with the concept of my invention as distinguished from the pertinent prior art. The best mode in which we have contemplated carrying out our invention is illustrated in the accompanying drawings forming part of this specification, in which:

Fig. 1 is a somewhat diagrammatic isometric view of the machine looking from the right-hand front corner thereof, portions of the machine being broken away for convenience or clarity of illustration, and a part of the machine being shown in exploded relation.

Fig. 2 is a somewhat diagrammatic front elevation of the card feed and delivery portions of the machine, some parts being broken away and some parts being shown in vertical section.

Fig. 3 is a somewhat diagrammatic isometric view of the card feed portion of the machine, portions of the machine being shown in exploded relation. The view is taken from the rear looking towards the right-hand front corner of the machine, i.e., looking in the opposite direction along the line of view in Fig. 1.

Fig. 4 is a top plan view of the table for receiving the stack of cards to be photographed and of the card-feed mechanism, a portion of the table being broken away. The front of the machine is at the bottom of the view.

The machine of the present invention comprises generally an automatic camera 15, a card feeding and exhibiting mechanism 16, and a drive mechanism (only a small portion of which is shown) for operating in timed relation both the camera 15 and the card feeding and exhibiting mechanism 16. The card feeding and exhibiting mechanism 16 carries the cards forwardly and, after each card is photographed, it is removed by the machine and the cards stacked in order.

The machine of the present invention is intended primarily for the make-up of lists, such as directories, price lists, and the like. At present it finds its greatest utility in the making up of lists that are subject to change, in that, to provide for changes, cards may be added, substituted or withdrawn, each card bearing a single line of type or single listing.

Figure 9:
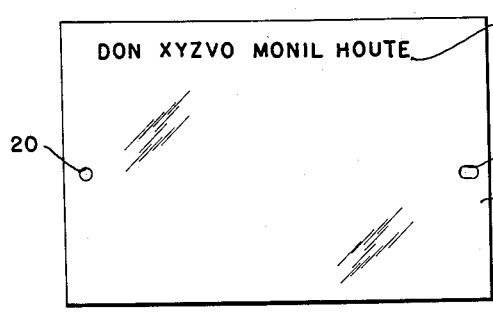
Fig. 9 is a somewhat diagrammatic view of one of the cards for use in the machine of the present invention.

The cards for the present machine may be 3¼" x 5"

such as the card 17 shown in Fig. 9, or the card may be somewhat longer, if desired, such as the standard tabulating card for use with tabulating machines and sorting machines. The card has at least one typed line 19 which is spaced very precisely with relation to a physical portion of the card, e.g. the holes 20 and 21, these holes serving as guides for positioning the cards for photographing in the machine to be described. The composed line 19 is not only spaced a specific and uniform distance above the holes 20 and 21 but is also located very precisely lengthwise of the card, so as to maintain substantially perfect columnar alignment in the made-up list, as will be explained.

Preferably, the card 17 is written with a composing machine such as the "Vari-Typer" which will produce a line of type closely approximating printing in appearance and quality. The holes 20 and 21 should be punched in the card at the time the card is inserted in the composing machine so as to assure a definite and uniform positioning of the composed line with relation to the holes. Such a machine is disclosed in the patent application of Bently Raak, S.N. 529,840, now Patent No. 2,820,539. The holes 20 and 21 are later used for accurately locating the card while it is being photographed.

Preferably, the hole 20 adjacent the starting end of the typed line is round and positively locates this portion of the card by means of a cylindrical pilot pin, as will be explained. The hole 21 is preferably somewhat oval, having a major diameter aligned with the center of the hole 20 and parallel to the typed line 19, and having a minor diameter equal to the diameter of the hole 20 although the hole 21 is intended to be received on a cylindrical pilot pin. In such a construction, minor dimensional changes of the card due to variations in the moisture content after punching will not cause the card to stick on the pilot pins or cause the pilot pins to enlarge the holes. Moreover, the round hole 20 adjacent the start of the typed line 19 serves to accurately locate this portion of the card 17 for photographing, the oval hole 21 merely serving to keep the card level.

The machine of the present invention receives a stack of the cards 17 (Fig. 1), each bearing a single line of type on the side thereof facing the camera 15. The cards are automatically photographed one by one on a film (not shown) which is contained within the camera 15 and progressed a single line (or unit) after each exposure, the film subsequently being developed and used for the photolithographic production of a printing plate. After each exposure, the foremost card 17 of the stack is fed downwardly and conveyed to a file drawer where it is stacked in sequence without disturbing the orientation of the cards, the cycle of the machine being repeated until the entire stack has been photographed to make up the desired listing or other printed matter.

The machine of the present invention operates in substantially the same manner as the machine disclosed in said application S.N. 428,572. The automatic camera 15 of the present invention is essentially similar to the automatic camera disclosed in my prior application and operates in a similar manner. Except insofar as set forth herein, the drive mechanism of the present machine is similar to the drive mechanism described in detail in my previous application and operates in a similar manner. The present application deals principally with improvements in that portion of the machine for feeding and exhibiting the cards and for delivering the cards and stacking them in a file drawer after being photographed.

The card feed and exhibiting mechanism 16 comprises a generally flat horizontal table 22 for receiving a stack of the cards 17 on edge. The cards 17 are more or less aligned by resting with their bottom edges on the table 22 and their rear vertical edges against a raised flange 24, which is on the rear side of the table as the machine is viewed in Figs. 1 and 2.

Each card 17 while being photographed is held against a face plate 26 which extends upwardly transversely of the left end of the table 22 and covers the middle and lower portions of the card, the upper edge 27 (Figs. 5 and 6) of the face plate being a little below the typed line 19 of the card. The side of the face plate against which the card is held is flat and smooth, and the face plate is fixedly supported by uprights 29 and 30 (Figs. 1 and 2) mounted on the front and back of the table 22.

A knife feeder 31 is mounted directly above the face plate 26, the knife feeder extending between the uprights 29 and 30 and being supported for vertical reciprocating motion by, and portions of the feeder being received within, opposed vertical grooves 32 and 34 (Fig. 3) within the uprights 29 and 30, respectively. In its raised or normal position, the lower edge 35 (Fig. 5) of the knife feeder is slightly above the typed line 19 on the card 17 to permit the line to be photographed when the knife feeder is in raised position. The face of the knife feeder towards the stack of cards 17 is stepped, the lower surface 36 of that face of the knife feeder immediately above the lower edge 35 being in the plane of the surface of the face plate 26 against which the foremost card 17 is held. The upper surface 37 of the knife feeder 31 lies in a plane slightly in front (towards the card 17) of the lower surface 36, the distance between the planes of the two surfaces being somewhat less than the thickness of a single card 17. The step 39 between the surfaces 36 and 37 may be undercut slightly as indicated in the drawings, and, in the normal or raised position of the knife feeder, is slightly above the top edge of the stack of cards 17.

The surface of the table 22 extends almost to the plane of the face plate 26, the space between the edge 40 of the table and the plane of the face plate being somewhat more than the thickness of a single card 17 but less than twice the thickness of a single card so as to permit the passage of only one card at a time through the slot between the face plate and the table.

The construction and arrangement of the face plate 26, knife feeder 31 and slot is such that, during photographing, the foremost card 17 of the stack of cards rests against the face plate and the lower surface 36 of the knife feeder. Upon downward movement of the knife feeder, the step 39 thereof engages the top edge of the foremost card 17 and slides the card downwardly along the surface of the face plate and partially through the space between the edge 40 of the table and the face plate 26. The width of the step 39 assures that the knife feeder in its downward motion will engage only the foremost card, and the width of the slot between the table edge 40 and the face plate assures that only a single card will be fed downwardly, thus obviating the possibility of a second card sticking to the back of the foremost card and being carried downwardly therewith.

A pair of card feed rolls 41 and 42 are located immediately below the slot or gate between the face plate 26 and the table edge 40, the nip or contact line of the rolls receiving the lower edge of a card 17 fed downwardly through the slot by the knife feeder 31. The feeder roll 41 may be a driven roll and the feeder roll 42 an idler roll. One or both of the rolls may be discontinuous, and the idler roll 42 is mounted on a series of arms 44 and spring-pressed against the roll 41 by a series of springs 45. The roll 41 is continuously driven at a peripheral speed in excess of the speed at which the knife feeder 31 descends so that, as the knife feeder moves downwardly and pushes the foremost card 17 into the nip or line of contact of the rolls 41 and 42, the rolls will seize the card and move it downwardly at a somewhat increased speed so that there will be no tendency of the knife to buckle the card.

The knife feeder 31 descends only far enough to enter the lower edge of a card 17 into the nip of the feeder rolls 41 and 42 and then moves upwardly in the grooves 32 and 34 to its normal position. The spacing between the lower edge 35 of the knife feeder and the upper edge 27 of the face plate when the knife feeder is in raised, normal position is sufficient to permit the knife feeder to move downwardly the required amount to feed the card 17 into the feed rolls as above described. Upon upward motion of the knife feeder 31, the step 39 thereof rides over the top edge of the next succeeding card 17, the card then being in position for photographing and subsequent feeding.

Figure 7:
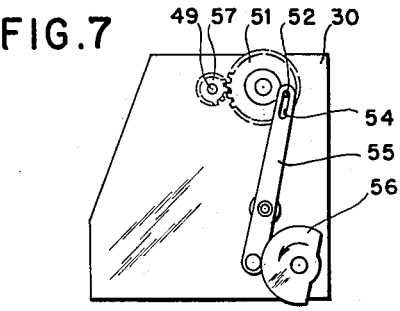
Fig. 7 is a more or less diagrammatic fragmentary elevation looking from the rear of the machine and showing the mechanism for actuating the knife feeder to feed the foremost card downwardly.

The knife feeder 31 is provided with a pair of vertically extending gear racks 46, 46 on the card-remote rear face thereof which mesh with a functionally continuous gear 47 fixed to a horizontally extending shaft 40 journalled in the uprights 29 and 30. The shaft 49 is oscillated for card feeding and return movement of the knife feeder 31 by a pinion 57 (Fig. 7) mounted on the end of the shaft 49 which meshes with a gear 51 journalled on the upright 30 and having a crank pin 52 thereon engaged within a slot 54 of a lever 55 pivotally mounted on the upright 30. A cam 56, which is rotated in timed relation with operation of the camera 15 by a drive mechanism (not shown), oscillates the lever 55 which in turn oscillates the gear 51 and pinion 57 to cause the knife feeder 31 to be dropped and raised in timed relation with operation of the camera.

The typed line 19 appearing on the card 17 is photographed by the camera 15 while the knife feeder 31 is in raised position. To illuminate the portion of the card bearing the typed line 19, a pair of lights 57, 57 of the fluorescent-tube type may be positioned on the camera side of the face plate 26 and knife feeder 31, the spacing between the lights being sufficient to permit photographing the line between the lights. The lights 57, 57 are continuously illuminated.

The stack of cards 17 is moved along the top of the table 22 by a series of two or more longitudinally extending tapes or bands 59, 59 upon which the bottom edges of the cards 17 rest and by a card follower 60 which holds the back end of the stack of cards upright, the tape bands 59, 59 and the follower 60 progressing forwardly in union to move the cards towards the face plate 26.

Figure 5:
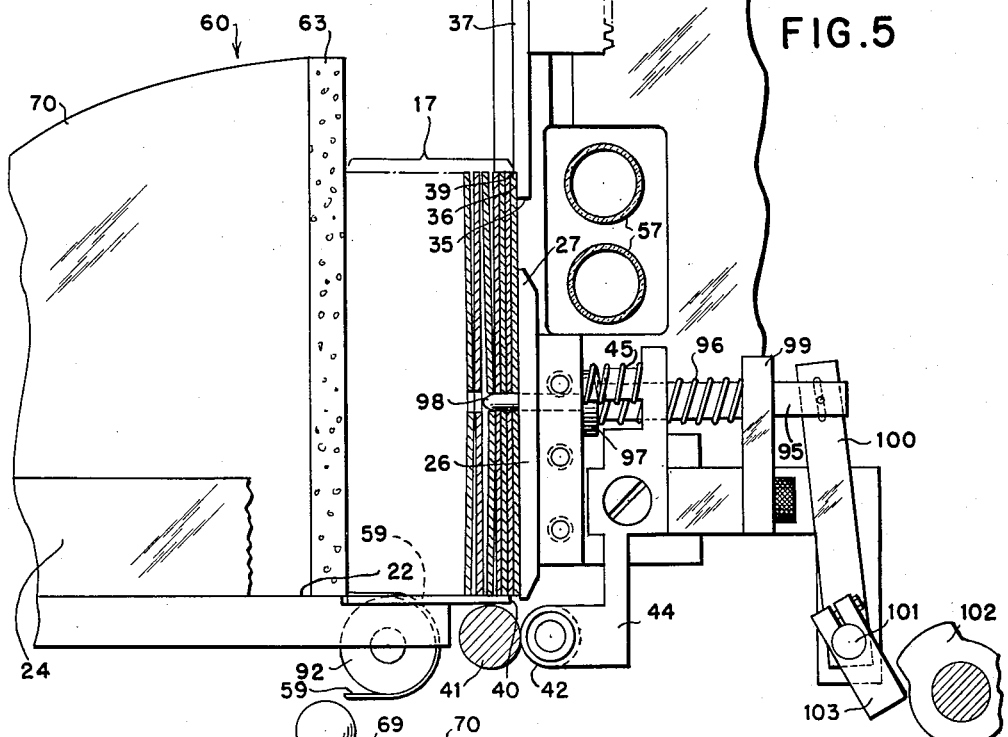
Fig. 5 is a somewhat diagrammatic rear elevation of the card follower and the mechanism for positioning the cards during photographing, and the mechanism for feeding the cards downwardly after photographing, portions of the machine being shown in vertical section and a few of the cards being shown.
Figure 8:
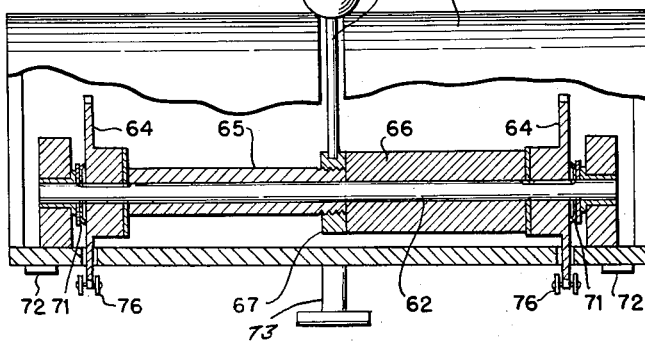
Fig. 8 is a more or less diagrammatic elevation of the card follower, a portion of the casing of the follower being broken away and certain of the parts being shown in vertical section taken along the axis of the follower shaft. The view is taken looking from the right end of the machine as it appears in Fig. 1.
Figure 6:
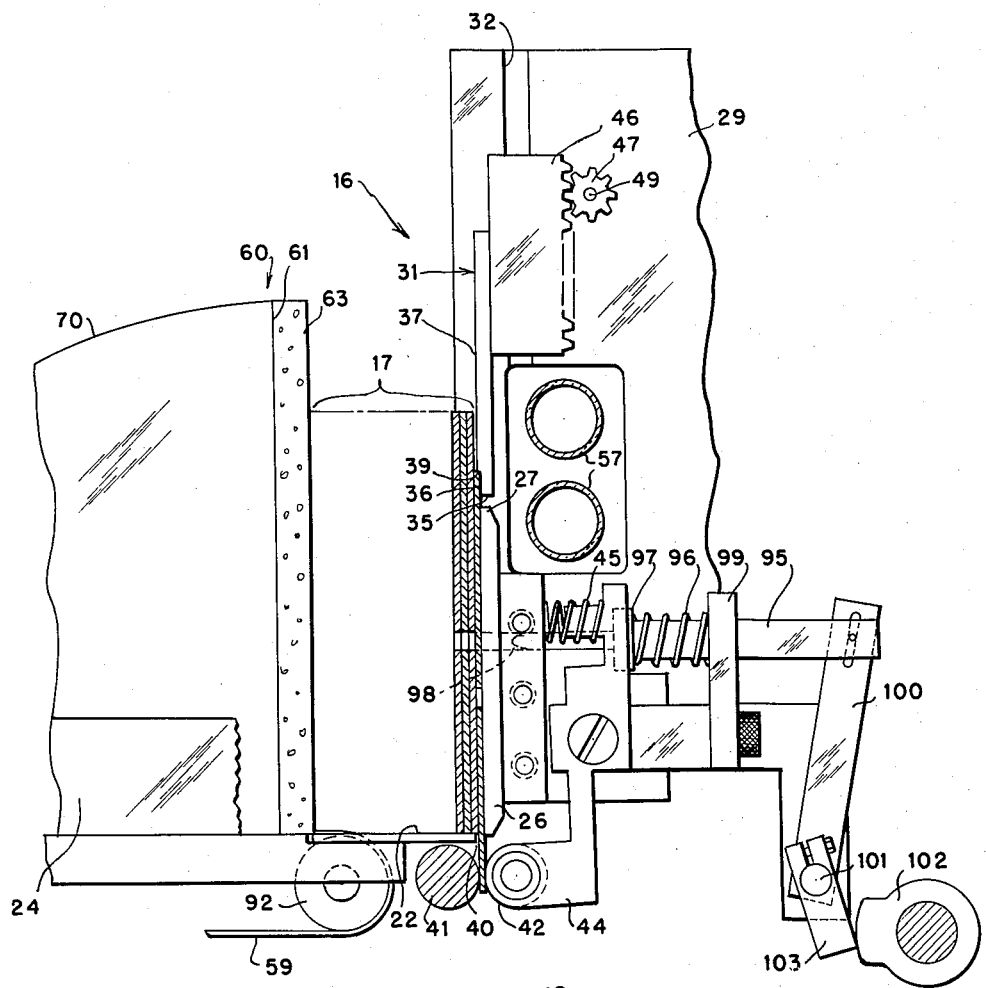
Fig. 6 is a view similar to Fig. 5, the card positioning pins being shown retracted and the foremost card being shown fed partway downwardly from the stack.

The card follower 60 is perhaps best seen in Figs. 5 and 8. It comprises a housing having a vertical forward surface 61 for engagement against the rear of the stack of cards 17 and which may be covered with a layer 63 of sponge rubber or the like. A card follower shaft 62 extends longitudinally of the card follower and transversely of the table 22 and is journalled for rotation within the card follower housing. A pair of sprockets 64, 64 are mounted one adjacent each end of the shaft 62 and are so arranged as to rotate with the shaft at all times but to be capable of limited movement longitudinally of the shaft.

A pair of abutting bushings 65 and 66 extend about the shaft 62 between the hubs of the sprockets 64, 64, the end of the bushing 65 adjacent the bushing 66 threadedly receiving a clamping nut 67 which may be rotated about the bushing 65 to bear against the end of bushing 66 and force the ends of the two bushings against the hubs of the sprockets 64, 64. The clamping nut 67 is operated by a lever 69 projecting from the rear surface 70 of the card follower housing.

Deformed washers 71, 71 are located between the hubs of the sprockets 64, 64 and the bearings of the shaft 62, the arangement being such that rotating the clamping nut 67 to force the bushings 65 and 66 outwardly against the sprockets 64, 64, moves the sprockets outwardly slightly so as to flatten the washers 71, 71 slightly and clamp the shaft and sprockets against rotation within the housing.

The card follower 60 is slidable along the table 22 and has a pair of guide bearings 72, 72, projecting from the lower surface of the housing riding on the table 22.

In addition, an inverted T-shaped member 73 is received within a longitudinal slot 74 (Figs. 1, 3 and 4) forming a track longitudinally of the table, the laterally extending lower end of member 73 retaining the card follower on the table. The sprockets 64, 64 protrude from the bottom of the housing of the card follower 60, extend through longitudinal slots 75, 75 (Figs. 1, 3 and 4) in table 22 and engage a pair of endless chains 76, 76 (Figs. 8, 1, 2 and 4) extending longitudinally of the table, the top run of each chain being located a short distance below the top surface of the table.

The chains 76, 76 are supported on a series of sprockets 77 located below the table top (Figs. 1, 2 and 4). The sprockets 77 that are mounted adjacent the forward end of the table 22 are mounted on a shaft 79 (Figs. 1 and 2) which is intermittently driven to progress the top runs of the chains 76, 76 forwardly (towards the camera 15) a distance equal to the thickness of a single card 17 for each camera exposure. The shaft 79 is intermittently driven by the drive mechanism (not shown) of the machine, through a ratchet mechanism diagrammatically shown in Fig. 1.

The ratchet mechanism includes a cam 80, which is continuously driven by the drive mechanism and oscillates a lever 81 which, operating through a drag link 82, operates a ratchet 84 of the "Sprag clutch" type to intermittently rotate a shaft 85 having a gear 86 fixed thereto which meshes with a second gear 87 fixed to the shaft 79.

A second ratchet 89 of the "Sprag clutch" type and fixed to the frame of the machine prevents reverse rotation of the shaft 85 during return movement of the drag link 82 and ratchet 84. An abutment screw 90 controls the initial position of the lever 81, and adjustment of this screw determines the amount of rotation of the shaft 85 for each rotation of the cam 80 and thus provides a close adjustment of the feed of chains 76, 76 for different thicknesses of cards. The resilience of the sponge-rubber layer 63 (Fig. 3) gives some latitude to the feed adjustment of the card follower 60.

The two or more flexible tapes or bands 59 extend about pulleys 92 and 94 (Figs. 2, 5 and 6) at the two ends of the table, these bands being preferably of flat plastic or textile tape lying on the surface of the table 22 and having an end anchored to the bottom of the housing of the card follower 60 so as to move forward therewith. The other ends of the tapes 59 are secured to the rear of the card follower 60 by springs 68 to maintain the tapes under tension.

The arrangement of the card follower and its associated parts is such that the stack of cards 17 is supported by the bottom edges of the cards resting on two or more of the bands 59 rather than on the table. As the machine is operated and cards are fed downwardly from against the face plate 26, the card follower 60 and the runs of the bands 59 resting on the table move forwardly to feed the cards. However, inasmuch as the lower edges of the cards are supported on the bands 58 rather than sliding along the top of the table 22, there is no friction on the edges of the cards such as would tend to compress the stack of cards and cause increased friction between the cards which might interfere with card feeding.

Rotating the clamping nut 67 of the card follower 60 to unclamp the sprockets 64, 64 permits the shaft 62 and sprockets to turn freely and thus the card follower may be pushed by hand along the top of the table to permit insertion of a stack of cards 17, and then the card follower may be pushed into juxtaposition with the rear of the stack of cards and the clamping nut tightened by means of the lever 69 to cause the card follower to move forwardly with the chains 76, 76 as the machine operates.

During photographing of the type line 19 on the card 17, the holes 20 and 21 in the card receive a pair of pilot pins 95, 95 (Figs. 3, 4, 5 and 6) which very accurately position the card for photographing with respect to the typed line. Both of the pilot pins are cylindrical and are a relatively close fit within the holes 20, 21 the card-entering ends 98, 98 of the pins being rounded or tapered to guide the cards into perfect registry. The oval hole 21 in each card merely provides pin clearance for minor changes in dimension of the cards with changes in their moisture content.

The pilot pins 95, 95 are mounted for reciprocatory movement through the face plate 26, the rounded forward ends of the pins projecting through the face plate a distance equal to the thickness of several of the cards 17. Each pilot pin 95 is biased by a compression spring 96 into normal position in which the forward end 98 of the pin protrudes from the face plate, one end of the spring 96 pressing against a collar 97 (Fig. 5) on the pin and the other end pressing against a guide 99 for the pin.

To permit the cards to be fed downwardly after photographing, the pins are retracted by levers 100 fixed to a transverse shaft 101 and pivotally connected to the ends of the pins 95. A rotary cam 102, which may be mounted on the same shaft as the cam 56 for operating the knife feeder 31 oscillates a cam follower 103 fixed to the shaft 101 to retract the pins 95 from the holes of the cards 17 for a portion of the operating cycle of the machine, so that the card resting against the face plate 26 will be free to be pushed downwardly by the knife feeder 31. For longer cards, the pilot pins 95, 95 may be spaced further apart.

The machine of the present invention is so constructed and arranged that there is substantially no pressure between the cards 17 of the stack of cards. Thus, friction between the individual cards which might interfere with their feeding after photographing is reduced to a minimum. The card follower 60, and tapes 59, 59 upon which the cards rest, are intended merely to bring the foremost card 17 up to a position adjacent the face plate 26. To hold the foremost card 17 tightly against the face plate 26 and the lower surface 36 of the knife feeder, a partial vacuum is applied to that portion of the face of the card extending across an aperture 105 (Fig. 1) in the face plate. This aperture may be connected with a centrifugal blower (not shown) by an air duct 106 (Fig. 2) which supplies sufficient suction to hold the card firmly against the face plate 26 and the lower face 36 of the knife feeder 31 during photographing and feeding of the card downwardly. The amount of suction is not sufficiently great to cause excessive friction between the card 17 and the face plate 26, which might interfere with the feeding of the card. A second smaller aperture 113 (Fig. 1) in the face plate 26, connected with the duct 106, may be used with larger sized cards, this aperture being blocked when smaller cards are used.

The card 17, after being photographed, is fed downwardly between the feed rolls 41, 42 as already explained. The card 17, as it issues from between the feed rollers, enters (Fig. 2) between upper and lower card guides 107 and 109, of a conveyor 108, each card guide of which may be formed of a plurality of individual strips of metal. The upper and lower card guides 107 and 109 are formed to converge as indicated in the drawings, the converged space being such that the card cannot become inverted or otherwise disturbed from its oriented position.

The cards 17 are not permitted to fall freely between the guides 107 and 109, but are conveyed downwardly individually in an inclined direction as indicated in the drawings by a conveyor consisting of a pair of endless chains 110, 110 (Figs. 1 and 2) mounted on sprockets 111. A series of bars mounted on the chains and extending transversely of the guides 107 and 109 have projections 112 that are located between the individual strips of the guides and which project across the space between the guides 107 and 109. The spacing along the chains 110 of projections 112 is sufficient for the reception of a single card. The chains 110 are intermittently driven through a single rotation clutch 118 by a continuously operated motor 117, which also drives the card feed roller 41, so that each card 17 is separately conveyed. The single rotation clutch 118 is actuated by a cam 116 mounted on the same shaft as cams 56 and 102 (Fig. 3) for operating the knife feeder 31 and retracting the pilot pins 95, 95, respectively, so as to synchronize intermittent movement of the bars 112 with the feeding of the cards 17.

The machine of the present invention is provided with an automatic stop, not shown, which will stop the operation of the machine if a card fails to feed downwardly after being photographed, in event of other malfunction of the machine, or completion of photographing of all the cards resting on the table 22. A generally similar mechanism is disclosed in said patent application S.N. 428,672. By providing a separate mechanical drive as above described, the conveyor 108 may be operated separately from operation of the rest of the machine by manually tripping the clutch 118 to progress the remaining cards downwardly through the conveyor 108 and into a card-receiving drawer (to be described) after the machine has ceased to operate upon the photographing and feeding of the last of the cards 17 on the table 22.

A card-receiving tray or drawer 119 (Fig. 2) is supported in an inclined position below the lower end of the conveyor 108 for receiving the cards 17 fed from the conveyor. The tray 119 is supported by an inclined shelf 120 which has a hinge 121 at its lower end permitting the shelf 120 to be rotated clockwise as viewed in Fig. 2 to permit insertion or withdrawal of the tray 119, as will be explained. The shelf 120 has a projection 122 against which the lower end of the tray 119 rests. A support 124 is pivotally mounted at its lower end and is so arranged that it may be swung against a serrated member 125 on the underside of the shelf 120 to support the shelf.

The cards 17 issuing from the lower end of the conveyor 108 are not permitted to fall freely within the tray 119, but are received on a card supporter 126. The card supporter 126 is a generally flat member extending within the tray 119 from the open top side thereof.

The card supporter 126 is mounted on a pair of endless chains 127 (one shown) supported on sprockets 129, 129, the lower end of the conveyor 108 projecting between the pair of chains. Initially, the card supporter 126 is positioned immediately below the lower end of the conveyor 108 so as to receive the cards directly from the conveyor. A series of stiff wires 130 (Figs. 1 and 2) project downwardly and obliquely across the mouth of the conveyor 108 to aid in guiding the cards 17 issuing from the conveyor onto the stack of cards being accumulated on the card supporter 126. Preferably, the wires 130 are capable of limited vertical swinging movement about their upper ends so that, initially, the lower ends of these wires rest on the card supporter 126. As cards are accumulated on the card supporter, the wires rest on the topmost cards of the pile.

As the machine operates, the cards 17 are accumulated in a stack on top of the card supporter 126, the card supporter being moved downwardly a small increment at a time by the same drive mechanism (previously described) which moves the card follower 60 forwardly. The details of the drive are indicated in Fig. 1.

The rate of drive of the card supporter 126 and its supporting chains 127, 127 is such that the topmost card 17 of the stack of cards supported on the stack supporter is maintained immediately below the lower end of the conveyor 108. A mechanism, not shown, is provided for resetting the card supporter 126 to its initial position immediately below the lower end of the conveyor 108 by oscillating the chains 127 and sprockets 129 in a direction counter to that in which these parts are driven during operation of the machine.

We claim:

1. In make-up apparatus for photographing a succession of lines of typed material in columnar form by photographing a series of cards, each bearing a typed line, a table for receiving a stack of cards on edge, a face plate and a knife feeder having faces against which the cards in succession are positioned, said faces lying generally in a common plane and the knife feeder having a step for engaging and feeding the foremost card of the stack edgewise upon movement of the knife feeder, at least one pilot pin projecting into said common plane and received within a previously punched hole in the card to position the card for photographing, means for retracting the pilot pin while the photographed card is being fed, and means for applying a partial vacuum to the front face of the foremost card to press it into contact with the face plate.

2. In make-up apparatus for photographing a succession of lines of typed material in columnar form by photographing a series of cards, each bearing a typed line, a table for receiving a stack of cards on edge, a face plate and a knife feeder having faces against which the cards in succession are positioned while being photographed, said faces lying generally in a common plane and the knife feeder having a step for engaging and feeding the foremost card of the stack edgewise upon movement of the knife feeder, at least two pilot pins protruding from the face plate and received within previously punched holes in the card to position the card for photographing, means for retracting the pilot pins while the photographed card is being so fed, and means for applying a partial vacuum to the front face of the foremost card to press it into contact with the face plate.

3. In make-up apparatus for photographing a succession of lines of typed material in columnar form by photographing a series of cards, each bearing a typed line: a table for receiving a stack of cards on edge, a substantially planar face plate against which the cards are successively positioned, at least one pilot pin protruding transversely of the plane of the face plate and received within a previously punched hole in the card to position the card for photographing, means for feeding the foremost card of the stack edgewise from the face plate, and means for retracting the pilot pin while the card is being so fed.

4. In make-up apparatus for photographing a succession of lines of typed material in columnar form by photographing a series of cards, each bearing a typed line: a table for receiving a stack of cards on edge, a face plate against which the cards are successively positioned, at least one pilot pin protruding from the face plate and received within a previously punched hole in the card to position the card for photographing, means for feeding the foremost card of the stack edgewise from the face plate after photographing, and means for retracting the pilot pin while the photographed card is being so fed.

5. In make-up apparatus for photographing a series of lines of typed material in columnar form by photographing a series of cards, each bearing a typed line, card feeding and handling mechanism comprising: a table for receiving a stack of cards on edge, a generally vertical face plate against which the cards are successively positioned, a card follower for supporting the rear of the stack of cards in a generally vertical position, at least one card advancing member extending along the top surface of the table from the card follower in the direction of the face plate and upon which member the stack of cards rests on edge with the edges of the cards out of contact with the surface of the table, means including a knife feeder to remove the cards one after another from the face plate by edgewise movement in a vertical plane, and means to advance both the follower and the advancing member simultaneously to thereby bring the next card against the face plate upon removal of the preceding card.

6. In make-up apparatus for photographing a series of lines of typed material in columnar form by photographing a series of cards, each bearing a typed line, card feeding and handling mechanism comprising: a table for receiving a stack of cards on edge, a generally vertical face plate against which the cards are successively positioned, a card follower for supporting the rear of the stack of cards in a generally vertical position, a flexible tape extending along the top surface of the table from the card follower in the direction of the face plate and upon which tape the stack of cards rests on edge with the edges of the cards out of contact with the surface of the table, means including a knife feeder to remove the cards one after another from the face plate by edgewise movement in a vertical plane, means to advance both the follower and the tape to thereby bring the next card against the face plate upon removal of the preceding card, and a common drive means for the card removing means and the means for advancing the follower and the tape.

7. In make-up apparatus for photographing a series of lines of typed material in columnar form by photographing a series of cards, each bearing a typed line, card feeding and handling mechanism comprising: a table for receiving a stack of cards on edge, a generally vertical face plate against which the cards are successively positioned, a card follower for supporting the rear of the stack of cards in a generally vertical position, and means extending along the table from the card follower in the direction of the face plate and upon which means the stack of cards rests on edge with the edges of the cards out of contact with the surface of the table, means including a knife feeder to remove the cards one after another from the face plate by edgewise movement in a vertical plane, and mechanism to advance both the follower and the means upon which the cards rest to thereby bring the next card against the face plate upon removal of the preceding card.

8. In make-up apparatus for photographing a series of lines of typed material in columnar form by photographing a series of cards, each bearing a typed line, card feeding and handling mechanism comprising: a table for receiving a stack of cards on edge, a generally vertical face plate against which the cards are successively positioned, a card follower for supporting the rear of the stack of cards in a generally vertical position, and means extending along the table from the card follower in the direction of the face plate and upon which means the stack of cards rests on edge with the edges of the cards out of contact with the surface of the table, means including a knife feeder to remove the cards one after another from the face plate by edgewise movement in a vertical plane, mechanism to advance both the follower and the means upon which the cards rest to thereby bring the next card against the face plate upon removal of the preceding card, and a common drive means for the card-removing means and for the mechanism for advancing the follower and the means upon which the cards rest.

9. In make-up apparatus for photographing a succession of lines of typed material in columnar form by photographing a series of cards, each bearing a typed line, a table for receiving a stack of cards on edge, a face plate and a knife feeder having faces against which the cards in succession are positioned, said faces lying generally in a common plane and the knife feeder being adapted to engage and feed the foremost card of the stack edgewise upon movement of the knife feeder, and means for applying a partial vacuum to the front face of the foremost card to press it into contact with the face plate.

10. In make-up apparatus for photographing a succession of lines of typed material in columnar form by photographing a series of cards, each bearing a typed line: a table for receiving a stack of cards on edge, a face plate, located in a given plane, against which the cards are successively positioned in erect posture, a pair of pilot pins protruding into said plane and received within a pair of previously punched holes in the card to position the card for photographing, means for feeding the foremost card of the stack edgewise from the face plate, and means for retracting the pilot pins while the card is being so fed.

11. In make-up apparatus for photographing a succession of lines of typed material in columnar form by photographing a series of cards, each bearing a typed line: a table for receiving a stack of cards on edge, a face plate against which the cards are successively positioned while being photographed, a pair of pilot pins protruding from the face plate and received within a pair of previously punched holes in the card to position the card for photographing, means for feeding the foremost card of the stack edgewise from the face plate after photographing, and means for retracting the pilot pins while the photographed card is being so fed.

12. In make-up apparatus for photographing a series of lines of typed material in columnar form by photographing a series of cards, each bearing a typed line, card feeding and handling mechanism comprising: a table for receiving a stack of cards on edge, a generally vertical face plate against which the cards are successively positioned, a card follower for supporting the rear of the stack of cards in a generally vertical position, at least one card advancing member extending along the top surface of the table from the card follower in the direction of the face plate and upon which member the stack of cards rests on edge with the edges of the cards out of contact with the surface of the table, means including a knife feeder to remove the cards one after another from the face plate by edgewise movement in a vertical plane, means to advance both the follower and the advancing member simultaneously to thereby bring the next card against the face plate upon removal of the preceding card, a pair of pilot pins projecting transversely of said vertical plane and received in previously punched hole in each card to position the card for photographing, and means for retracting the pilot pins while a card is being fed.

References Cited in the file of this patent
UNITED STATES PATENTS

| | | |
|---|---|---|
| 1,154,237 | Dixon | Sept. 21, 1915 |
| 1,477,920 | Stewart | Dec. 18, 1923 |
| 1,719,334 | Marcy | July 2, 1929 |
| 2,234,342 | Goodell et al. | Mar. 11, 1941 |
| 2,300,185 | Von Hofe | Oct. 27, 1942 |
| 2,624,576 | Lauffer | Jan. 6, 1953 |